3,003,987
COPOLYMER OF ACRYLIC ACID ESTER, METHOD OF MAKING, AND USE OF SAID POLYMER TO COAT TEXTILE FABRICS
Onslow B. Hager, Glenside, and Robert A. Martin, Levittown, Pa., assignors to Alco Oil & Chemical Corporation, Philadelphia, Pa., a corporation of Ohio
No Drawing. Filed Nov. 14, 1957, Ser. No. 696,339
18 Claims. (Cl. 260—29.6)

This invention relates to novel acrylic resin copolymers particularly suitable in the finishing of textile materials, and to methods for their production. More particularly, this invention is concerned with novel textile finishing compositions comprising acrylic resin copolymers for rendering component yarns, including floats, of textile fabrics more resistant to raveling and yarn displacement when subjected to various stresses incident to washing, dyeing, drying, stretching, and like operations, or to flexing during use.

This invention also relates to improved textile fabrics, such as those commonly used for upholstering cushions, furniture, bus and automobile seats, and the like, in which a flexible coating of a novel film-forming acrylic resin copolymer is applied to a surface of the textile fabric in order to stabilize the relative position of the individual yarns against displacement during use or during washing, drying, dyeing, and like operations.

This invention is further concerned with a novel method for forming acrylic resin copolymers having the aforementioned and other valuable properties.

It is well known that component yarns of a textile fabric may be rendered more resistant to raveling and displacement from their relative intended positions during use or washing and like operations by means of a number of well known compositions comprising a vulcanizable rubber. For example, upholstery fabrics have been coated on the back side with flexible coatings of rubber, both natural and synthetic. These rubber coatings are vulcanized with sulfur, the rate of vulcanization generally being accelerated by means of activators, such as oxides of certain metals, e.g., zinc oxide, and accelerators, such as dithiocarbamates, thiurams, thiazoles, xanthates, aryl amines, ureas, thioureas, and the like. In addition, anti-degradants are used extensively for protection against deterioration by oxygen, ozone, and oxides of nitrogen, which deterioration is accelerated by light, heat, and the catalytic influence of certain metals such as copper and manganese, and of certain organic compounds.

While such vulcanized rubber coatings perform the function of stabilizing the location of yarns of a textile fabric during use, they have a number of disadvantages. For example, they severely restrict the art of the dyer by limiting the number of dyes which may be used to those which do not react chemically with the activators, accelerators, and antidegradients. Also, they require the use of far more expensive dyes than those which may be used to give the necessary dye performance on a fabric where there is no interaction between the coating and/or the ingredients thereof, and the dyestuffs.

Furthermore, many of the chemicals employed to assist the vulcanization and protection of such rubber coatings, react with traces of metals in water supplies and with most commercially available chemicals, surfactants, etc., to form intensely colored bodies which act as dyes for many of the synthetic fibers now commonly in use. Unfortunately, colored bodies so formed have very little color fastness, and fade when subjected to light, and are removed by washing of the fabric. Consequently, the formation of these colored bodies must be avoided, often by resort to expensive expedients.

While it is known that many unvulcanized rubbers will form a transparent coating on fabrics, chemicals which are required to assist the vulcanization and protection of rubbers cause these coatings to become opaque. This opacity of the vulcanized rubber coatings seriously limits the use of these coatings in many applications.

A further disadvantage of vulcanized rubbed coatings is that vulcanization is greatly influenced by variations in the time and temperature of curing, and in the nature of the accelerators used. This sensitivity to small variations in these vulcanization conditions and materials requires exacting control thereof during the curing of a rubber coating on a fabric.

Many synthetic resins, which do not require vulcanization, have been used in the coating of textile fabrics. Although these coatings do not suffer from the above-mentioned disadvantages of vulcanized rubber coatings, and many withstand flexing and raveling forces exerted during normal use of the fabric, most of the nonvulcanizable synthetic resin coatings cannot withstand scouring and dyeing operations, for during such operations the coating is largely removed, and the yarns are permitted to ravel.

A principal object of the present invention is to provide novel acrylic resin copolymers which are particularly suitable for coating textile fabrics to render the component yarns of such fabrics more resistant to raveling and displacement from their intended relative positions during ordinary use and during washing, dyeing, and like operations.

Another object of this invention is to provide novel acrylic resin copolymers which are especially useful in coating textile fabrics to provide them with increased ravel resistance, which copolymer coatings do not require vulcanization or other resin curing treatment, and are capable of withstanding scouring and dyeing operations with no significant decrease in their ability to stabilize relative yarn positions of a textile.

Still another object of the present invention is to provide acrylic resin copolymers for coating textile fabrics to stabilize the relative positions of their component yarns, which copolymers do not react chemically with dyes commonly employed in the upholstery industry.

A further object of the invention is the provision of acrylic resin copolymer coatings for textile fabrics which do not react with metals in water supplies, or with commercially available chemicals, surfactants, and the like, to form intensely colored bodies.

Yet another object of this invention is to provide novel acrylic resin copolymers which are particularly suitable for forming transparent coatings on textile fabrics.

A further object of this invention is to provide novel acrylic resin copolymer latex compositions which advantageously may be thickened by means of ammonia and alkali metal hydroxides, thereby obviating the difficulties encountered by the use of external thickeners such as polyvinyl alcohol, sodium polyacrylate, and the like.

A still further object of this invention is the provision of improved textile fabrics having a coating of a novel acrylic resin copolymer which renders the component yarns of the fabric more resistant to raveling and to displacement during washing and dyeing operations, and in ordinary use.

Another object of the invention includes the provision of a novel textile finishing composition in the form of a latex comprising an acrylic resin copolymer.

Yet a further object of this invention is to provide a novel method for producing these extremely valuable acrylic resin copolymers.

These and other objects of this invention will become more clearly apparent from a consideration of this specification and appended claims.

According to this invention there is provided a novel acrylic resin comprising a copolymer of a vinyl ester monomer of the formula:

$$CH_2=CHOOCR$$

in which R is hydrogen and an alkyl radical containing from 1 to 4 carbon atoms, a diester of a dibasic acid of the formula:

$$XOOCCH=CHCOOX$$

in which X is an alkyl group containing from 1 to 8 carbon atoms, an acid monomer selected from the group consisting of polymerizable, dicarboxylic, aliphatic acids containing from 4 to 5 carbon atoms and anhydrides thereof, and a modifier monomer which is an ester of acrylic acid and a monohydroxy alcohol containing from 1 to 3 carbon atoms.

Generally, acrylic resins according to this invention may comprise a copolymer of from about 30 to about 80 parts, by weight, of vinyl ester monomer, from about 2.5 to about 15 parts of acrylic ester monomer, from about 1 to about 5 parts of acid monomer, and from about 10 to about 65 parts of modifier monomer.

A preferred acrylic resin comprises a copolymer of from about 50 to about 70 parts, by weight, of vinyl acetate, from about 5 to about 10 parts of dibutyl maleate, from about 2 to about 3 parts of fumaric acid, and from about 20 to about 50 parts of ethyl acrylate, the acrylic resin having a molecular weight of from about 100,000 to about 600,000.

As has been pointed out previously, one of the disadvantages of a large number of coatings for textile materials comprising a synthetic resin is that such coatings undergo substantial detachment from the yarns during washing, drying and like operations, with the result that there is considerable raveling and displacement of the component yarns of the fabric. It was found, however, that the novel acrylic resin copolymers of this invention provide coatings for textile materials, which coatings undergo substantially no detachment from the yarns during such washing, dying and like operations, and thereby prevent undesirable raveling and yarn displacement. Furthermore, these novel copolymer coatings render textile fabrics more resistant to raveling and yarn displacement caused by stresses during ordinary use of the fabric. These novel copolymers have further advantages in that they do not react with ordinary dyes, and do not require vulcanizing accelerators and activators, which materials react with dyes and other chemicals, and metals in water supplies to form intensely colored bodies. Because of the "wash fastness," i.e. resistance to detachment during washing, dying, scouring, and like operations, of the novel copolymer coating of this invention, they are particularly useful in the manufacture of textiles, as for example upholstery fabrics and rugs, where it is particularly essential that yarn displacement and raveling during subsequent dying of the textiles be prevented. Also, because of the excellent resistance to ravelling of textile yarns during ordinary use provided by the novel acrylic resin copolymer coatings of this invention, textiles so coated are particularly useful for upholstering bus and automobile seating, furniture, pillows, and the like, which may be subjected to strenuous use.

The preferred acrylic resin copolymers of this invention also have an additional extremely valuable property in that when they are in the form of a latex, the latex may be thickened by replacing a portion or all of the hydrogen ions of carboxy groups along the copolymer chain with ammonium or alkali metal ions by means of ammonium or alkali metal hydroxides. This type of thickening may be referred to as "internal thickening" since it is due to the resulting ammonium and alkali metal carboxylate groups which form an integral part of the copolymers. Thus, latexes having a wide range of viscosities may be obtained without resort to the use of "external thickeners" such as sodium polyacrylate and polyvinyl alcohol, which materials interfere with good adhesion of resins to yarn, may have objectionable odors, and have a tendency to be removed from the resin coatings during washing and like operations thereby weakening resin adhesion.

The novel acrylic resin copolymers of this invention may be considered as being formed of four primary monomer components, namely: a monomer which provides the copolymer with film-forming properties, a monomer which acts as an internal plasticizer for the copolymer, a monomer which provides the copolymer with the desired adhesive properties, and a modifying monomer which enhances the appearance, feel and other desirable properties of the copolymer. These monomers may be copolymerized according to methods more fully described hereinafter.

Those monomers which may be employed to provide the resulting copolymers with desirable film-forming properties are vinyl esters of the general structural formula:

$$CH_2=CHOOCR$$

wherein R is hydrogen or an alkyl radical containing from 1 to 4 carbon atoms. Typical of the "film-forming" vinyl ester monomers are vinyl formate, vinyl acetate, vinyl propionate, vinyl butyrate, and vinyl valerate, the preferred film-forming monomer being vinyl acetate.

Monomers which are suitable for use as internal plasticizers for the copolymers of this invention are diesters of bibasic acids having the general structural formula:

$$XOOCCH=CHCOOX$$

in which X is an alkyl radical containing from 1 to 8 carbon atoms. In other words, these monomers are diesters of maleic and fumaric acid. The alkyl radicals may comprise either a straight or branched chain and may be the same or different alkyl radicals. Typical monomers for this purpose are dimethyl, diethyl, dibutyl, dihexyl and dioctyl maleate and fumarate. Preferred monomers which act as internal plasticizers for the resulting copolymers are dibutyl maleate and dibutyl fumarate.

The third primary ingredient of the copolymers of this invention is the acid "adhesive" monomer, which provides the resulting copolymer with the desired adhesive properties. Suitable acid monomers, which provide adhesive properties, may be selected from the group consisting of polymerizable, dicarboxylic, aliphatic acids containing from 4 to 5 carbon atoms and anhydrides of these dicarboxylic acids. Typical of these acid monomers are maleic, fumaric, itaconic, mesaconic, and citraconic acids, and maleic and citraconic anhydride. Preferred acid or "adhesive" monomers are fumaric and itaconic acid.

In addition to the three monomer constituents discussed above, certain "modifier" monomers are copolymerized therewith in order to improve the appearance, feel and/or hand of the resulting copolymer coating or of the coated fabric and to increase the elasticity of the copolymers. Monomers which may be employed as modifiers in a practice of this invention are esters of acrylic acid and a monohydroxy alcohol containing from 1 to 3 carbon atoms. Typical modifier monomers are methyl, ethyl, and propyl esters of acrylic acid, the preferred modifier monomer being ethyl acrylate.

Of course, rather than a single monomer component, such as an adhesive monomer, or the like, a mixture of adhesive monomer components, modifier monomers, etc., may be employed therefor in forming the novel copolymers.

Preferred copolymers according to this invention may comprise from about 50 to about 70 parts, by weight, of vinyl ester monomer, from about 5 to about 10 parts of a diester of a dibasic acid, from about 2 to about 3 parts of acid monomer, and from about 20 to about 50 parts of modifier monomer.

The novel acrylic resin copolymers may be prepared by emulsion polymerization to provide a latex comprising a copolymer having a molecular weight above about 100,000 and generally in the range between about 100,000 and about 600,000. Such a synthetic resin latex advantageously is particularly suitable for the coating of textiles to provide them with greatly increased resistance to raveling.

An especially suitable emulsion polymerization method, which is also within the scope of this invention, comprises copolymerizing a film-forming monomer, an internal plasticizing monomer, an adhesive monomer and a modifier monomer, each of which has been heretofore described, in aqueous medium in the presence of a peroxide catalyst and an anionic emulsifier. Preferably, the method is carried out in the presence of both an anionic emulsifier and a non-ionic stabilizer for reasons more fully described hereinafter.

Catalysts which may be used according to the copolymerization method of this invention are peroxide compounds having the bivalent —O—O— group. It will be understood, therefore, that the term peroxide is used herein in the usual chemical sense and is limited to compounds having the bivalent group —O—O—.

These peroxide compounds may be either organic or inorganic. Examples of organic peroxides are: alkyl derivatives of hydrogen peroxide like ditertiarybutylperoxide, ditertiaryamylperoxide, tetrahydronaphthaleneperoxide, acyl peroxides like acetylperoxide, benzoylperoxide, lauroylperoxide. Examples of suitable inorganic peroxides are: hydrogen peroxide; metal peroxides like those of sodium, barium or zinc, and salts containing the peroxide group, like the alkali persulfates, perborates and sodium carbonate peroxide.

In most cases the cheap, and easily obtainable organic peroxides, ethylperoxide and benzoylperoxide, and the inorganic peroxide salts sodium persulfate and sodium perborate are preferred.

Mixtures of peroxide substances may also be employed.

The emulsion polymerization method of this invention is carried out in the presence of certain anionic surface active agents, which are water soluble in their acid form, and act as emulsifiers for the liquid monomers and prevent to a considerable degree coagulation of the formed copolymer particles. These anionic emulsifiers comprise alkyl sulfonates, alkyl aryl sulfonates, amides of sulfosuccinic acid, alkylphenoxypolyethoxyethyl sulfates and fatty alcohol sulfates.

The alkyl and alkyl aryl sulfonates have the general structural formula:

$$R'SO_3X'$$

in which R' is an alkyl group containing from 8 to 18 carbon atoms or an alkyl aryl group containing from 12 to 20 carbon atoms.

In the above and succeeding structural formulae for anionic emulsifiers suitable for use in the process of this invention, X' is hydrogen, sodium or potassium. As mentioned above, these anionic emulsifiers are water soluble in their acid form. The reason for this is that during copolymerization, acid conditions prevail in the aqueous copolymerization medium due to the presence of the acid monomer. Thus, the anionic emulsifiers are, to a large degree, in acid form in this acid aqueous medium. Since these emulsifiers are generally more readily available in the form of water soluble salts, e. g. the sodium and potassium salts, the use of such salts is preferred, the salts being converted in the aqueous acid medium to the acid form.

Referring again to the alkyl sulfonates described by the structural formula above, suitable substances of this type are: sodium and potassium octyl-, nonyl, decyl, hendecyl-, dodecyl-, tridecyl-, tetradecyl-, pentadecyl-, hexa- decyl-, heptadecyl- and octadecylsulfonate. A preferred alkyl sulfonate comprises sodium dodecylsulfonate.

Alkyl aryl sulfonates which may be used are those derived from benzene, naphthalene, diphenyl and diphenylmethane, and include among others: sodium and potassium hexyl-, heptyl-, octyl-, nonyl-, decyl-, hendecyl-, dodecyl, tridecyl-, and tetradecylbenzene sulfonate. As with the alkyl sulfonates, the alkyl group in the alkyl aryl sulfonates may comprise either a straight or branched chain. A preferred alkyl aryl sulfonate comprises sodium dodecylbenzene sulfonate.

Those anionic emulsifiers which are amides of sulfosuccinic acid which may be employed in the present method have the general structural formula:

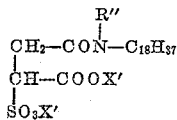

in which R'' is hydrogen or the group:

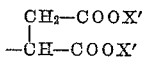

Typical of these amides of sulfosuccinic acid is n-octadecyl tetrasodium 1,2-dicarboxyethyl succinamate.

Alkylphenoxypolyethoxyethyl sulfates also find use as anionic emulsifiers in the method of this invention, and have the general structural formula:

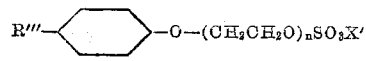

in which R''' is an alkyl group, which may be a straight or branched chain, containing from 8 to 10 carbon atoms and n is an integer from 2 to 5. Suitable compounds of this type include sodium and potassium octyl-, nonyl-, and decylphenyl-, di-, tri-, tetra- and pentaethyleneglycol sulfate, and the like. Preferred substances include sodium ditertiarybutylphenyl- di-, tri-, tetra- and pentaethyleneglycol sulfate.

Also included among the anionic emulsifiers which may be employed in the present method are fatty alcohol sulfates of the general structural formula:

$$CH_3(CH_2)_{n'}OSO_3X'$$

in which n' is an integer from 7 to 17. Typical substances of this type are sodium and potassium octyl-, nonyl-, decyl-, hendecyl-, dodecyl-, tridecyl-, tetradecyl-, pentadecyl-, hexedecyl-, heptadecyl- and octadecylsulfate. Sodium lauryl sulfate is a preferred fatty alcohol sulfate for the purposes of this invention.

Generally from about 2 to about 5 parts, and preferably from about 2 to about 3 parts, by weight, of anionic emulsifier for each 100 parts of total monomers to be copolymerized is employed. If less than about 2 parts of anionic emulsifier is used, substantial coagulation of copolymer product may occur.

It was found that if a non-ionic stabilizer is employed in conjunction with the anionic emulsifier during copolymerization, the resulting copolymer latex not only provides coatings for fabrics which have excellent wash fastness, but that the latex may be thickened, as desired, to provide a wide range of viscosities, by converting free acid carboxy groups of the copolymers to ammonium and alkali metal carboxylate groups as previously described herein.

Non-ionic stabilizers for the purpose of this invention include polyoxyethylated fatty alcohols, polyoxyethylated sorbitan monoesters and alkyl phenyl ethers of polyethylene glycol.

Non-ionic stabilizers which are polyoxyethylated fatty alcohols have the general structural formula:

$$Y'O(CH_2CH_2O)_{n''}H$$

in which Y' is an alkyl group containing from 10 to 20 carbon atoms and n'' is an integer from 15 to 40. Examples of non-ionic stabilizers of this type are polyoxyethylated stearyl, palmityl and oleyl alcohol. A preferred stabilizer is polyoxyethylated oleyl alcohol containing about 30 ethylene oxide groups.

Polyoxyethylated sorbitan monoesters which are suitable for use in the present method have the general structural formula:

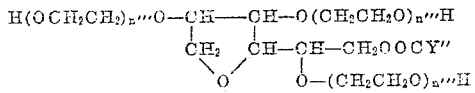

in which $Y''$ is an alkyl group containing from 7 to 17 carbon atoms and $n'''$ is an integer from 2 to 5. Typical compounds of this class include polyoxyethylated sorbitan monocaprylate, monopelargonate, monocaprate, monohendecanate, monolaurate, monotridecanate, monomyristate, monopentadecanate, monopalmitate, monomargarate and monostearate. A preferred material of this type is polyoxyethylated sorbitan monolaurate in which the polyoxyethylene chains contain about 3 ethylene oxide groups.

Alkylphenyl ethers of polyethylene glycol may also be used as non-ionic stabilizers, and have the general structural formula:

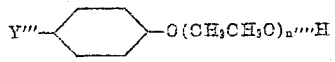

in which $Y'''$ is an alkyl group containing from 6 to 12 carbon atoms and $n''''$ is an integer from 5 to 30. Suitable compounds of this type include hexyl-, heptyl-, octyl-, nonyl-, decyl-, hendecyl-, and dodecylphenyl penta-, hexa-, octa-, deca-, hendeca-, dodeca-, trideca-, tetradeca- and pentadeca-, eicosa-, pentacosa-, and triacontaethylene glycol. The alkyl group may be either a straight or branched chain. 2-ethylhexylphenyl, n-octylphenyl and ditertiarybutylphenylpolyethylene glycol containing from about 10 to 12 ethylene oxide groups are particularly useful as non-ionic stabilizers, the last being a preferred stabilizer.

When a non-ionic stabilizer is employed with an anionic emulsifier the combined amount of stabilizer and emulsifier comprises from about 2 to about 5 parts, and preferably from about 2 to about 3 parts, by weight, thereof per 100 parts of total monomers to be copolymerized. In other words the non-ionic stabilizer merely replaces a portion of the anionic emulsifier. Generally the ratio of emulsifier to stabilizer is in the range between about 0.5:1 to about 5:1, by weight, a ratio of about 2:1 being preferred.

It was further found that in carrying out the method of this invention, the wash fastness of the novel copolymers could be even further enhanced by adding the monomers to the aqueous copolymerization medium in a certain manner. According to this embodiment of the invention a mixture of the film-forming monomer, the internal plasticizer monomer and the modifier monomer is added at a slow predetermined rate, generally dropwise, to the aqueous medium. The fourth monomer, i.e. the acid monomer, may be initially present in the aqueous medium or may be added at a predetermined rate during addition of the monomer mixture. Of course, the various monomers may be added separately, but addition of the above described monomer mixture is preferred.

As stated above, the film-forming monomer, the internal plasticizing monomer and the modified monomer are added at a predetermined slow rate. The rate of addition should be such that the total concentration of these three monomers, considered together, in unreacted form in the aqueous copolymerization medium is below about 3 percent, by weight. Preferably, the concentration based on these three unreacted monomers is from about 0.5 to about 1.0. In other words, these monomers are added at a rate which does not substantially exceed the rate of copolymerization.

The emulsion polymerization may be carried out at temperatures generally between about 65° and about 80° C., generally for a period of from about 1 to 4 hours. Preferably, polymerization temperatures in the range between about 70° and 75° C. are employed.

Sufficient water should be present in the aqueous copolymerization medium so that upon complete addition of all monomers, there is present from about 45 to 65 parts, by weight, of water to from about 35 to 55 parts of monomers.

If the process is carried out under the preferred conditions as set forth herein, yields of the novel copolymers in excess of 90 percent, and even 95 percent, are obtained. The copolymers so produced will have a molecular weight above about 100,000 as is indicated by the fact that they are substantially insoluble in acetone, i.e. they are not sufficiently soluble in acetone to form a one percent solution. Molecular weight of the copolymers may be determined viscometrically by means of an Ostwald-Fenske viscometer, employing acetone solutions of the copolymers having a concentration somewhat less than one percent, by weight, e.g. a 0.4 percent solution or less.

In coating textile fabrics, the resulting latex may be used as such, the latex being concentrated or diluted with further aqueous medium to provide a coating composition of a desired solids content. Such latexes may be employed to coat both synthetic and natural fibers, whether in the form of monofilaments or staple fibers. Yarns, and the like may be coated as such, or the resin coating may be applied to knitted and woven goods formed from such yarns.

In coating of fabrics, a latex having a solids concentration of from about 10 to 55%, by weight, may be employed. A preferred latex comprises from about 15 to about 35%, by weight, of solids. The preferred latex is in the unusual class of that which can be thickened by the addition of ammonium and alkali metal hydroxides to the desired viscosity. A particularly suitable viscosity for a latex for use in coating fabrics is about 2500 to about 8000 cps., and preferably from about 3500 to 4500 cps. Other thickeners, such as sodium polyacrylate, polyvinyl alcohol, and the like, also may be employed to vary viscosity; however, some reduction in wash fastness may occur. In addtion, the latexes may contain fillers such as clay, diatomaceous earth, and the like.

After the copolymers have been applied to the fabric by means of the latex, water is removed by heating the coated fabric to elevated temperatures for a short period of time. For example, the coated fabric may be heated to a temperature of from about 250° to 300° F., and preferably from about 260° to 280° F. for a period of from about 5 to 10 minutes to evaporate the aqueous medium. By so heating the coated fabric, wash fastness is improved and a more continuous film of copolymer results.

The following examples are illustrative of the invention, but are not intended as limiting the scope in any way.

*Example I*

A mixture of 190 g. of ethyl acrylate, 190 g. of vinyl acetate and 20 g. of dibutyl maleate is added dropwise with stirring over a period of three hours and 39 minutes to 600 g. of demineralized water maintained at a temperature of from 73° to 76° C. containing dissolved therein 10 g. of fumaric acid, 2 g. potassium persulfate, as catalyst, 5.6 g. of sodium ditertiarybutylphenyldiethyleneglycol sulfate. The demineralized water also contains 2.5 g. of polyoxyethylated oleyl alcohol containing about 30 ethylene oxide groups to stabilize the emulsion. During addition of the monomer mixture the concentration of those monomers forming the mixture, i.e. the concentration of the three monomers considered together, is held below about 3 percent and generally in the range between about 0.5 and 1 percent. After complete addition of the monomer mixture, reaction conditions are maintained for one additional hour. The yield of copolymer is 94% of theoretical.

The acrylic resin copolymer latex, so prepared, is diluted with additional water to provide a solids concentration of about 35%, by weight, and the viscosity of the latex is adjusted to about 4000 cps., a viscosity which is particularly suitable for coating textile fabrics, by the addition of ammonia.

The latex is applied to 9" x 9" squares of a viscose filament rayon satin by means of a doctor fixed-blade knife coater adjusted to a setting of 16 mm., and the coated fabric is thereafter dried at 270° F. for 6 minutes. The squares of coated test fabric are washed for 39 minutes at a temperature of 180° F. in a single-speed reversing wheel type washing machine loaded with 4 lbs. of 9" x 9" squares of uncoated cotton duck. In each washing, 42,000 g. of a 0.5% solution of a commercial detergent, Dreft, are employed. After washing and rinsing, the squares of coated test fabric are examined for fraying of the peripheral yarns. Uncoated squares of the test fabric are completely unravelled by this test procedure.

The test samples are graded on the following basis, wherein the size of the sample after washing is that of the unravelled (in tact) remainder.

| Rating: | Size of test sample after wash test, in. |
|---|---|
| 1–2 | Greater than 7¼ |
| 3.0 | 6¾–7¼ |
| 3.5 | 6¼–6¾ |
| 4.0 | 5⅞–6¼ |
| 4.5 | 5⅜–5⅞ |
| 5.0 | 0–5⅜ |

The acrylic resin copolymer described above imparted to the test fabric excellent resistance to ravelling in the wash test as indicated by a rating of 1.5.

*Example II*

Example I may be repeated employing vinyl valerate in place of vinyl acetate.

*Example III*

Example I may be repeated employing propyl acrylate in place of ethyl acrylate.

*Example IV*

Example I may be repeated employing sodium lauryl sulfate as an anionic emulsifier in place of sodium ditertiarybutylphenyl-diethyleneglycol sulfate.

*Example V*

Example I may be repeated employing n-octadecyl tetrasodium 1,2-dicarboxyethyl succinamate an anionic emulsifier in place of sodium ditertiarybutylphenyldiethyleneglycol sulfate.

*Example VI*

Example I may be repeated employing sodium dodecylbenzene sulfonate in place of sodium ditertiarybutylphenyldiethyleneglycol sulfate.

*Example VII*

A mixture of 190 g. of ethyl acrylate, 190 g. of vinyl acetate and 20 g. of dibutyl fumarate is added dropwise with stirring over a period of one hour and 53 minutes to 600 g. of water at 70°–75° C. containing dissolved therein 10 g. of fumaric acid, 2 g. of potassium persulfate, 5.6 g. of sodium ditertiarybutylphenyldiethyleneglycol sulfate and 2.5 g. of polyoxyethylated oleyl alcohol containing about 30 ethylene oxide groups. After complete addition of the monomer mixture, reaction conditions are maintained for about one additional hour. A 90% yield of copolymer is obtained.

The resulting latex is adjusted to have a solids content of 35%, by weight, and a viscosity of 4000 cps., and is applied to viscose filament rayon satin samples in the manner described in Example I. The samples thereafter are dried and subjected to the washing test previously described. The fabric is found to have a rating of 1.5 for the wash test.

*Example VIII*

Example VII may be repeated employing dioctyl fumarate for dibutyl fumarate.

*Example IX*

Example VII may be repeated employing vinyl propionate for vinyl acetate.

*Example X*

Example VII may be repeated employing sodium octadecylsulfonate as an anionic emulsifier for sodium ditertiarybutylphenyldiethyleneglycol sulfate.

*Example XI*

Example VII may be repeated employing polyoxyethylatedsorbitan monostearate, each polyoxyethylene chain containing about 5 ethylene oxide groups, as a non-ionic stabilizer in place of polyoxyethylated oleyl alcohol.

*Example XII*

Example VII may be repeated employing an octylphenylether of polyethyleneglycol containing about 12 ethylene oxide groups as a non-ionic stabilizer in place of polyoxyethylated oleyl alcohol.

*Example XIII*

A mixture of 190 g. of ethyl acrylate, 190 g. of vinyl acetate and 20 g. of dibutyl maleate is added, dropwise, with stirring, over a period of two hours and 10 minutes to 600 g. of water at 71°–75° C. containing dissolved therein 10 g. of itaconic acid, 2.5 g. of potassium persulfate, 11.2 g. of sodium ditertiarybutylphenyldiethyleneglycol sulfate and 2.5 g. of polyoxyethylated oleyl alcohol containing about 30 ethylene oxide groups. After the addition of the monomer mixture is complete, reaction conditions are maintained for about one additional hour. A 91% yield of copolymer is thereby obtained.

This latex, when coated on viscose filament rayon satin test fabric and subjected to the wash test described in Example I, has a rating of 1.5.

*Example XIV*

Example XIII may be repeated employing maleic anhydride in place of itaconic acid.

The above description and examples are intended to be illustrative only and are not to limit the scope of the invention. Any departure therefrom which conforms to the spirit of the invention is intended to be included within the scope of the appended claims.

We claim:

1. An acrylic resin comprising a copolymer of from about 30 to about 80 parts, by weight, of a vinyl ester monomer of the formula:

in which R is selected from the group consisting of hydrogen and an alkyl radical containing from 1 to 4 carbon atoms, from about 2.5 to about 15 parts of a diester of a dibasic acid of the formula:

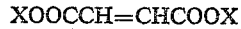

in which X is an alkyl radical containing from 1 to 8 carbon atoms, from about 1 to about 5 parts of an adhesive monomer selected from the group consisting of maleic, fumaric, itaconic, mesaconic, and citraconic acids, and maleic and citraconic anhydrides, and from about 10 to about 65 parts of modifier monomer which is an ester of acrylic acid and a monohydroxy alkyl alcohol containing from 1 to 3 carbon atoms, said copolymer having a molecular weight of from about 100,000 to 600,000.

2. An acrylic resin according to claim 1 comprising from about 50 to about 70 parts, by weight, of said vinyl ester monomer, from about 5 to about 10 parts of said diester of a dibasic acid, from about 2 to about 3 parts of said adhesive monomer, and from about 20 to about 50 parts of said modifier monomer.

3. An acrylic resin comprising a copolymer of from about 30 to about 80 parts, by weight, of vinyl acetate, of from about 2.5 to about 15 parts of dibutyl fumarate, of from about 1 to about 5 parts of itaconic acid, and from about 10 to about 65 parts of ethyl acrylate.

4. An acrylic resin comprising a copolymer of from about 50 to about 70 parts, by weight, of vinyl acetate, of from about 5 to about 10 parts of dibutyl fumarate, of from about 2 to about 3 parts of itaconic acid, and from about 20 to about 50 parts of ethyl acrylate, and having a molecular weight of from about 100,000 to 600,000.

5. A textile finishing composition adapted for sizing textile yarns and finishing textile fabrics comprising a stable aqueous dispersion of a copolymer of from about 30 to about 80 parts, by weight, of a vinyl ester monomer of the formula:

$$CH_2=CHOOCR$$

in which R is selected from the group consisting of hydrogen and an alkyl radical containing from 1 to 4 carbon atoms, from about 2.5 to about 15 parts of a diester of a dibasic acid of the formula:

$$XOOCCH=CHCOOX$$

in which X is an alkyl radical containing from 1 to 8 carbon atoms, from about 1 to about 5 parts of an adhesive monomer selected from the group consisting of maleic, fumaric, itaconic, mesaconic, and citraconic acids, and maleic and citraconic anhydrides, and from about 10 to about 65 parts of modifier monomer which is an ester of acrylic acid and a monohydroxy alkyl alcohol containing from 1 to 3 carbon atoms, said copolymer having a molecular weight of from about 100,000 to 600,000

6. A textile finishing composition according to claim 5 wherein said acrylic resin comprises a copolymer of from about 50 to about 70 parts, by weight, of said vinyl ester monomer, from about 5 to about 10 parts of said diester of a dibasic acid, from about 2 to about 3 parts of said adhesive monomer, and from about 20 to about 50 parts of said modifier monomer.

7. A textile finishing composition according to claim 5 wherein said acrylic resin comprises a copolymer of from about 50 to about 70 parts, by weight, of vinyl acetate, from about 5 to about 10 parts of dibutyl fumarate, from about 2 to about 3 parts of itaconic acid, and from about 20 to about 50 parts of ethyl acrylate, said copolymer having a molecular weight from about 100,000 to about 600,000.

8. An improved textile manufacture comprising a textile fabric which has been rendered substantially ravel resistant by a coating of an acrylic resin comprising a copolymer of from about 30 to about 80 parts, by weight, of a vinyl ester monomer of the formula:

$$CH_2=CHOOCR$$

in which R is selected from the group consisting of hydrogen and an alkyl radical containing from 1 to 4 carbon atoms, from about 2.5 to about 15 parts of a diester of a dibasic acid of the formula:

$$XOOCCH=CHCOOX$$

in which X is an alkyl radical containing from 1 to 8 carbon atoms, from about 1 to about 5 parts of an adhesive monomer selected from the group consisting of maleic, fumaric, itaconic, mesaconic, and citraconic acids, and maleic and citraconic anhydrides, and from about 10 to about 65 parts of modifier monomer which is an ester of acrylic acid and a monohydroxy alkyl alcohol containing from 1 to 3 carbon atoms, said copolymer having a molecular weight of from about 100,000 to 600,000.

9. An improved textile manufacture according to claim 8 in which said acrylic resin comprises a copolymer of from about 50 to about 70 parts, by weight, of said vinyl ester monomer, from about 5 to about 10 parts of said diester of a dibasic acid, from about 2 to about 3 parts of said adhesive monomer, and from about 20 to about 50 parts of said modifier monomer.

10. An improved textile manufacture according to claim 8 in which said acrylic resin is a copolymer of vinyl acetate, dibutyl fumarate, itaconic acid and ethyl acrylate.

11. An improved textile manufacture according to claim 8 in which said acrylic resin is a copolymer of vinyl acetate, dibutyl maleate, itaconic acid and ethyl acrylate.

12. A method for making an acrylic resin copolymer which comprises copolymerizing from about 30 to about 80 parts, by weight, based on total monomers of a vinyl ester monomer of the formula:

$$CH_2=CHOOCR$$

in which R is selected from the group consisting of hydrogen and an alkyl radical containing from 1 to 4 carbon atoms, from about 2.5 to about 15 parts of a diester of a dibasic acid of the formula:

$$XOOCCH=CHCOOX$$

in which X is an alkyl radical containing from 1 to 8 carbon atoms, from about 1 to about 5 parts of an adhesive monomer selected from the group consisting of maleic, fumaric, itaconic, mesaconic, and citraconic acids, and maleic and citraconic anhydrides, and from about 18 to about 65 parts of a modifier monomer which is an ester of acrylic acid and a monohydroxy alkyl containing from 1 to 3 carbon atoms, in aqueous medium at a temperature of from about 65° to about 80° C. in the presence of catalyst comprising a compound containing a peroxide group, and an anionic emulsifier, which is water soluble in its acid form, selected from the group consisting of alkyl and alkyl aryl sulfonates of the formula:

$$R'SO_3X'$$

in which R' is an alkyl group containing from 8 to 18 carbon atoms and an alkyl aryl group containing from 12 to 20 carbon atoms; an amide of sulfosuccinic acid of the formula:

$$\begin{array}{c} R'' \\ | \\ CH_2-CON-C_{18}H_{37} \\ | \\ CH-COOX' \\ | \\ SO_3X' \end{array}$$

in which R'' is hydrogen and:

$$\begin{array}{c} CH_2-COOX' \\ | \\ -CH-COOX' \end{array}$$

an alkylphenoxypolyethoxyethyl sulfate of the formula:

$$R'''-\!\!\!\left\langle\;\right\rangle\!\!-O-(CH_2CH_2O)_nSO_3X'$$

in which R''' is an alkyl group containing from 8 to 10 carbon atoms and $n$ is an integer from 2 to 5; and a fatty alcohol sulfate of the formula:

$$CH_3(CH_2)_{n'}\cdot OSO_3X'$$

in which $n'$ is an integer from 7 to 17, X' being hydrogen, sodium and potassium in said formulae; the concentration of unreacted monomer present in said aqueous medium during copolymerization, based on vinyl ester monomer, acrylic ester monomer and modifier monomer, being below about 3 percent, by weight.

13. The method of claim 12 in which the concentration of unreacted monomer is in the range between about 0.5 and about 1.0.

14. The method of claim 12 in which said copolymerization is carried out at a temperature of from about 70° to about 75° C.

15. The method of claim 12 in which said vinyl ester monomer, diester of a dibasic acid and modifier monomer are introduced to said aqueous medium as a mixture of said monomers.

16. The method of claim 12 in which from about 50 to about 70 parts, by weight, based on total monomers, of said vinyl ester monomer, from about 5 to about 10 parts of said diester of a dibasic acid, from about 2 to about 3 parts of said adhesive monomer, and from about 20 to about 50 parts of said modifier monomer are copolymerized.

17. The method of claim 12 in which said vinyl ester monomer comprises vinyl acetate, said diester of a dibasic acid comprises dibutyl fumarate, said adhesive monomer comprises itaconic acid, and said modifier monomer comprises ethyl acrylate.

18. The method according to claim 12 in which said copolymerization is carried out in the presence of a water-soluble non-ionic stabilizer selected from the group consisting of a polyoxyethylated fatty alcohol of the formula:

$$Y'O(CH_2CH_2O)_{n''}H$$

in which $Y'$ is an alkyl group containing from 10 to 20 carbon atoms and $n''$ is an integer from 15 to 40; a polyoxyethylated sorbitan monoester of the general formula:

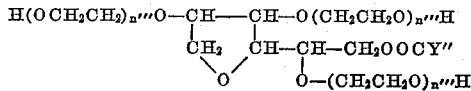

in which $Y''$ is an alkyl group containing from 7 to 17 carbon atoms and $n'''$ is an integer from 2 to 5; and an alkylphenyl ether of polyethylene glycol of the formula:

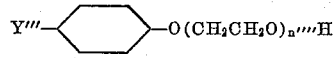

in which $Y''''$ is an alkyl group containing from 6 to 12 carbon atoms and $n''''$ is an integer from 5 to 30; the total quantity of emulsifier and stabilizer present being from about 2 to about 5 parts, by weight, per 100 parts of total monomers and the ratio of emulsifier to stabilizer being from about 0.5:1 to about 5:1.

References Cited in the file of this patent

UNITED STATES PATENTS

| | | |
|---|---|---|
| Re. 23,514 | Voss | June 24, 1952 |
| 2,726,230 | Carlson | Dec. 6, 1955 |
| 2,763,578 | Simons | Sept. 18, 1956 |
| 2,845,398 | Brown | July 29, 1958 |

FOREIGN PATENTS

| | | |
|---|---|---|
| 1,129,999 | France | Sept. 17, 1956 |

OTHER REFERENCES

Schildknecht: "Vinyl and Related Polymers," page 707, John Wiley and Sons, Inc., New York city (1952).